(12) United States Patent
Kessler et al.

(10) Patent No.: US 8,108,721 B2
(45) Date of Patent: Jan. 31, 2012

(54) ARCHITECTURE AND METHOD FOR HARDWARE-ASSISTED PROCESSOR CHECKPOINTING AND ROLLBACK

(75) Inventors: David J. Kessler, Tampa, FL (US); David R. Bueno, Cambridge, FL (US); David Paul Campagna, St Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 193 days.

(21) Appl. No.: 12/625,195

(22) Filed: Nov. 24, 2009

(65) Prior Publication Data

US 2011/0126049 A1    May 26, 2011

(51) Int. Cl.
*G06F 11/00* (2006.01)
(52) U.S. Cl. ............................................ 714/15; 714/16
(58) Field of Classification Search .................... 714/15, 714/16; 717/129
See application file for complete search history.

(56) References Cited

U.S. PATENT DOCUMENTS

| | | | |
|---|---|---|---|
| 5,269,017 A * | 12/1993 | Hayden et al. ................... 714/15 |
| 5,568,380 A | 10/1996 | Brodnax et al. | |
| 5,907,673 A | 5/1999 | Hirayama et al. | |
| 6,154,847 A | 11/2000 | Schofield et al. | |
| 6,199,055 B1 | 3/2001 | Kara et al. | |
| 6,202,149 B1 | 3/2001 | Hedegard | |
| 6,308,287 B1 | 10/2001 | Mitchell et al. | |
| 6,519,712 B1 | 2/2003 | Kim et al. | |
| 6,820,216 B2 * | 11/2004 | Cmelik et al. ................... 714/15 |
| 6,915,417 B2 * | 7/2005 | Stein et al. ......................... 713/1 |
| 7,027,064 B2 | 4/2006 | Lavelle et al. | |
| 7,117,391 B1 * | 10/2006 | Hornick et al. ................. 714/15 |
| 7,188,273 B2 | 3/2007 | Allen et al. | |
| 7,191,292 B2 | 3/2007 | Chaudhry et al. | |
| 7,305,675 B1 * | 12/2007 | Gulick ......................... 718/102 |
| 7,536,591 B2 * | 5/2009 | Varadarajan et al. ........... 714/15 |
| 7,562,263 B1 * | 7/2009 | Engelbrecht et al. ........... 714/49 |
| 7,574,709 B2 * | 8/2009 | Erlingsson et al. ........... 719/310 |
| 7,581,090 B2 * | 8/2009 | Miyake et al. ................. 712/244 |
| 7,930,684 B2 * | 4/2011 | Roeck et al. ................... 717/129 |
| 2001/0027502 A1 * | 10/2001 | Bronson et al. ................ 710/112 |
| 2003/0078933 A1 | 4/2003 | Gara et al. | |
| 2004/0260678 A1 | 12/2004 | Verbowski et al. | |
| 2007/0174484 A1 | 7/2007 | Lussier et al. | |
| 2007/0276879 A1 | 11/2007 | Rothman et al. | |
| 2008/0016393 A1 | 1/2008 | Bose et al. | |
| 2008/0059834 A1 | 3/2008 | Erstad | |
| 2008/0244544 A1 | 10/2008 | Neelakantam et al. | |
| 2009/0327807 A1 * | 12/2009 | Varadarajan et al. ........... 714/15 |

* cited by examiner

*Primary Examiner* — Yolanda L Wilson
(74) *Attorney, Agent, or Firm* — Fogg & Powers LLC

(57) ABSTRACT

A method to enable an adaptive fault tolerance in a data system is provided. The method includes communicatively coupling a radiation hardened hardware element to at least one interrupt service routine application in a respective at least one processing element, triggering an interrupt service routine by an interrupt signal received from the radiation hardened hardware element at the interrupt service routine application after an execution of a code block by the at least one processing element, and inspecting the internal state of the at least one processing element to determine if an error occurred.

20 Claims, 3 Drawing Sheets

ARCHITECTURE AND METHOD FOR HARDWARE-ASSISTED PROCESSOR CHECKPOINTING AND ROLLBACK

CROSS-REFERENCE TO RELATED APPLICATIONS

This application is related to U.S. patent application Ser. No. 12/625,209 having a title of "ARCHITECTURE AND METHOD FOR CACHE-BASED CHECKPOINTING AND ROLLBACK" (also referred to here as the "Ser. No. 12/625,209 Application") which is filed on the same date herewith. The Ser. No. 12/625,209 application is hereby incorporated herein by reference.

BACKGROUND

As demands for space data processing increase, advances in radiation-hardened by process (RHBP) technologies are struggling to keep up with performance requirements. Commercial-off-the-shelf (COTS) processing elements can be used in space to provide increased performance, however most COTS processors are extremely sensitive to single event effects induced by radiation. Currently available technologies for mitigating radiation-induced single event effects include full hardware-based triple modular redundancy (TMR), self-checking pairs, or software-based methods. However, the hardware methods require increases in size, weight, and power in order to detect and recover from upsets. The software methods require a processing element to save its own state at pre-determined intervals.

SUMMARY

The present application relates to a method to enable an adaptive fault tolerance in a data system. The method includes communicatively coupling a radiation hardened hardware element to at least one interrupt service routine application in a respective at least one processing element, triggering an interrupt service routine by an interrupt signal received from the radiation hardened hardware element at the interrupt service routine application after an execution of a code block by the at least one processing element, and inspecting the internal state of the at least one processing element to determine if an error occurred.

DRAWINGS

In accordance with common practice, the various described features are not drawn to scale but are drawn to emphasize features relevant to the present invention. Like reference characters denote like elements throughout figures and text.

DETAILED DESCRIPTION

The embodiments of systems described herein provide hardware-assisted checkpointing and recovery to provide fault tolerance with high flexibility and minimal application developer involvement. The system described herein uses a chip, external to the processing elements being protected, to enable performance and fault tolerance levels associated with a full hardware-based approach to fault tolerance (e.g., triple modular redundancy (TMR)) with drastically reduced size, weight, and power overhead (on the order of 100% reduction from a TMR system). Specifically, a reliable, radiation hardened hardware element (a bridge chip) and low overhead software-based fault-tolerance (an interrupt service routine application in the processing elements being protected) are combined to achieve fault tolerance. The scheme potentially detects errors much earlier than traditional self-checking pairs and/or triple modular redundancy approaches to fault tolerance, because the bridge chip inspects the processing element's internal state rather than relying on voting of external memory accesses.

Figure 1:
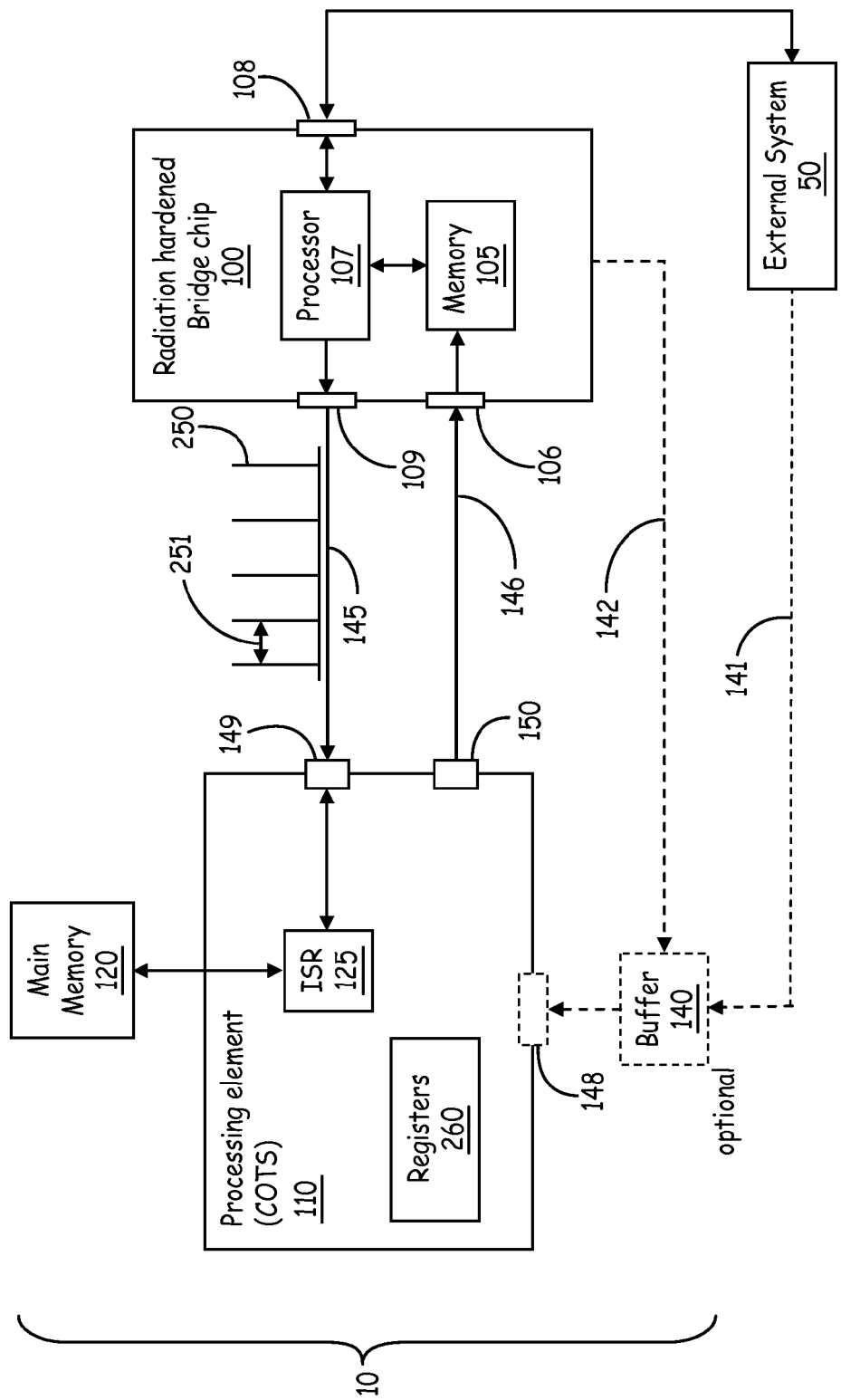
FIG. 1 is an embodiment of a hardware assisted checkpointing and recovery system to flexibly provide fault tolerance to a processing element in accordance with the present application.

FIG. 1 is an embodiment of a hardware assisted checkpointing and recovery system 10 to flexibly provide fault tolerance to a processing element 110 in accordance with the present application. The processing element 110 has fault tolerance is able to operate free of errors (or with relatively few errors) in an operating environment that is likely to cause errors. The hardware assisted checkpointing and recovery system 10 (also referred to herein as "system 10") includes an interrupt service routine application 125 in a processing element 110 and a radiation hardened hardware element 100 external to the processing element 110. The radiation hardened hardware element 100 is also referred to herein as "bridge chip 100" or "radiation hardened bridge chip 100." In one implementation of this embodiment, the processing element 110 is a commercial-off-the-shelf (COTS) processing element 110.

The bridge chip 100 includes a memory 105 and processor 107 that are communicatively coupled to each other. The bridge chip 100 also includes interfaces 108, 109, and 106. The processing element 110 includes the interrupt service routine application 125 and registers represented generally at 260. The processor registers 260 of the processing element 110 include status registers, program counter, integer, and floating point registers. The processing element 110 also includes interrupt interface 149, status interface 150, and an optional interface 148 to an external system 50. A main memory 120 is communicatively coupled to the processing element 110. In one implementation of this embodiment, the status interface 150 is a Joint Test Action Group (JTAG) interface 150 that provides visibility into the processor registers 260 of the processing element 110 at the bridge chip 100.

The external system 50 is communicatively coupled to the processing element 110 via interface 108 on the bridge chip 100. The bridge chip 100 is communicatively coupled via the interface 109, communication link 145, and interrupt interface 149 to issue an interrupt signal 250 to the processing element 110 at times that are temporally separated by intervals represented generally at 251. The intervals 251 can be of different durations since the duration of different code blocks may be variable. However, it is to be understood that sequential executions of the same code block will have the same interval 251 since the executions of the same code block have the same duration. The interrupt service routine application 125 in the processing element 110 is triggered to implement an interrupt service routine within the processing element 110 when an interrupt signal 250 is received.

In one implementation of this embodiment, the processing element 110 is running an operation system. In another implementation of this embodiment, the processing element 110 is receiving data from the external system 50 in a data stream via link 141. In an embodiment in which the processing element 110 is receiving data from the external system 50, the bridge chip 100 also sends the interrupt signal 250 via link 142 to the buffer 140 to signal the buffer 140 to store the data received during the interrupt service routine. In this manner, none of the data received from the external system 50 at the interface 148 is lost during the interrupt service routine.

Figure 2:
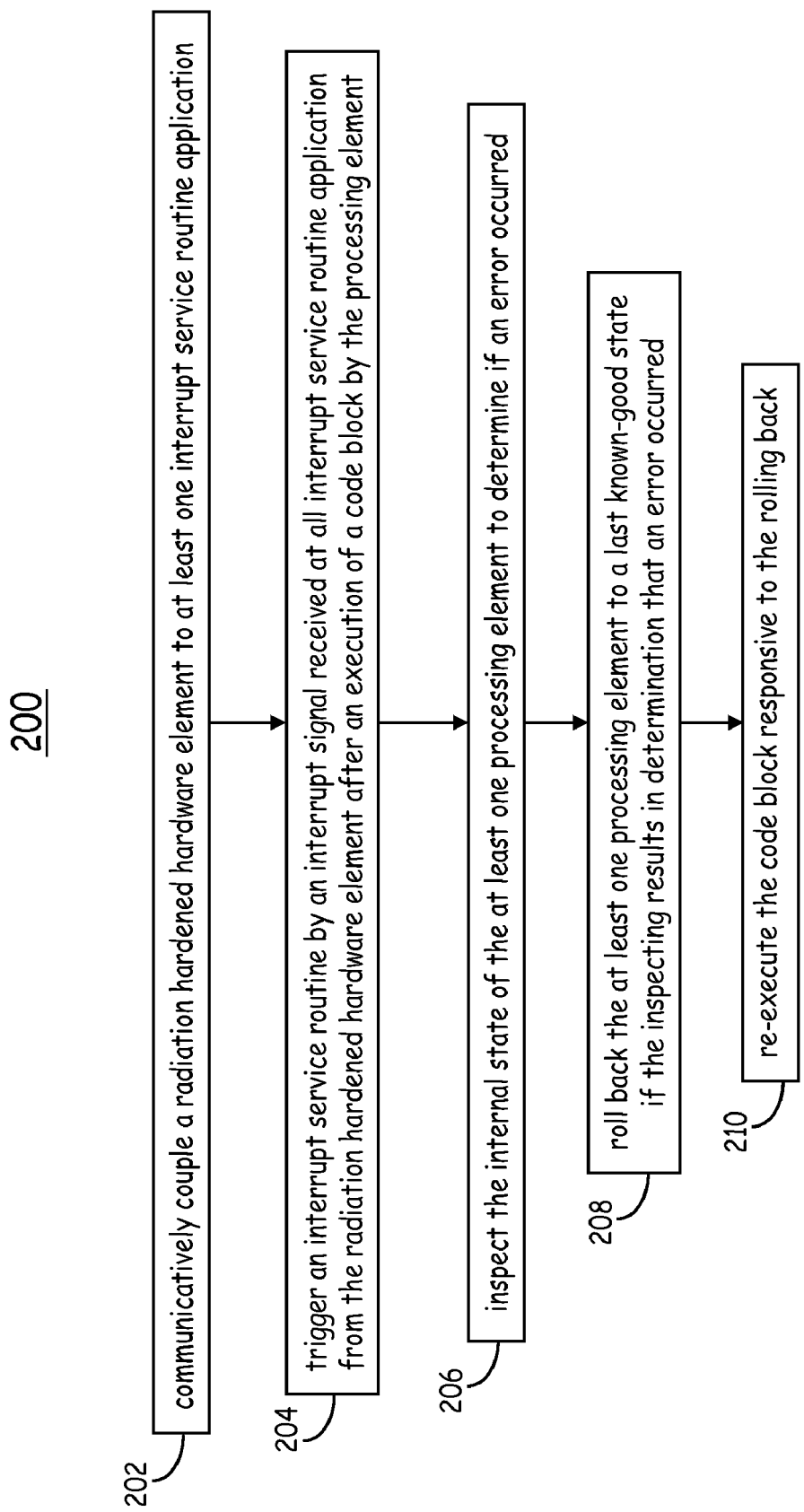
FIG. 2 is an embodiment of a method to enable an adaptive fault tolerance in a data system in accordance with the present application.

FIG. 2 is an embodiment of a method 200 to enable an adaptive fault tolerance in a data system in accordance with the present application. The processing element 110 is also referred to herein as the data system 110 in which the adaptive fault tolerance is enabled by method 200. The radiation hardened hardware element 100 (i.e., bridge chip 100) is communicatively coupled to the interrupt service routine application 125 in the processing element 110 being protected from faults by communication links 145 and 146 (block 202). The processor 107 is communicatively coupled via the interface 109, the communication link 145, and the interrupt interface 149 to the interrupt service routine application 125. The processing element 110 is communicatively coupled to the memory 105 in the radiation hardened bridge chip 100 via the status interface 150, the communication link 146, and the interface 106. The status interface 150 provides visibility into the processor registers 260 of the processing element 110 at the bridge chip 100.

The radiation hardened hardware element 100 triggers an interrupt service routine by sending an interrupt signal 250 that is received at the interrupt service routine application 125 after an execution of a code block by the processing element 110 (block 204). A code block is a segment of code executed between any two sequential checkpoints as is described in detail below in the discussion related to FIG. 3. The radiation hardened hardware element 100 inspects the internal state of the processing element 110 to determine if an error occurred (block 206). The radiation hardened hardware element 100 rolls back the processing element 110 to a last known-good state (also referred to herein as a start state) if the inspecting of block 206 results in a determination that an error occurred (block 208). The processing element 110 re-executes the code block responsive to the rolling back (block 210).

Figure 3:
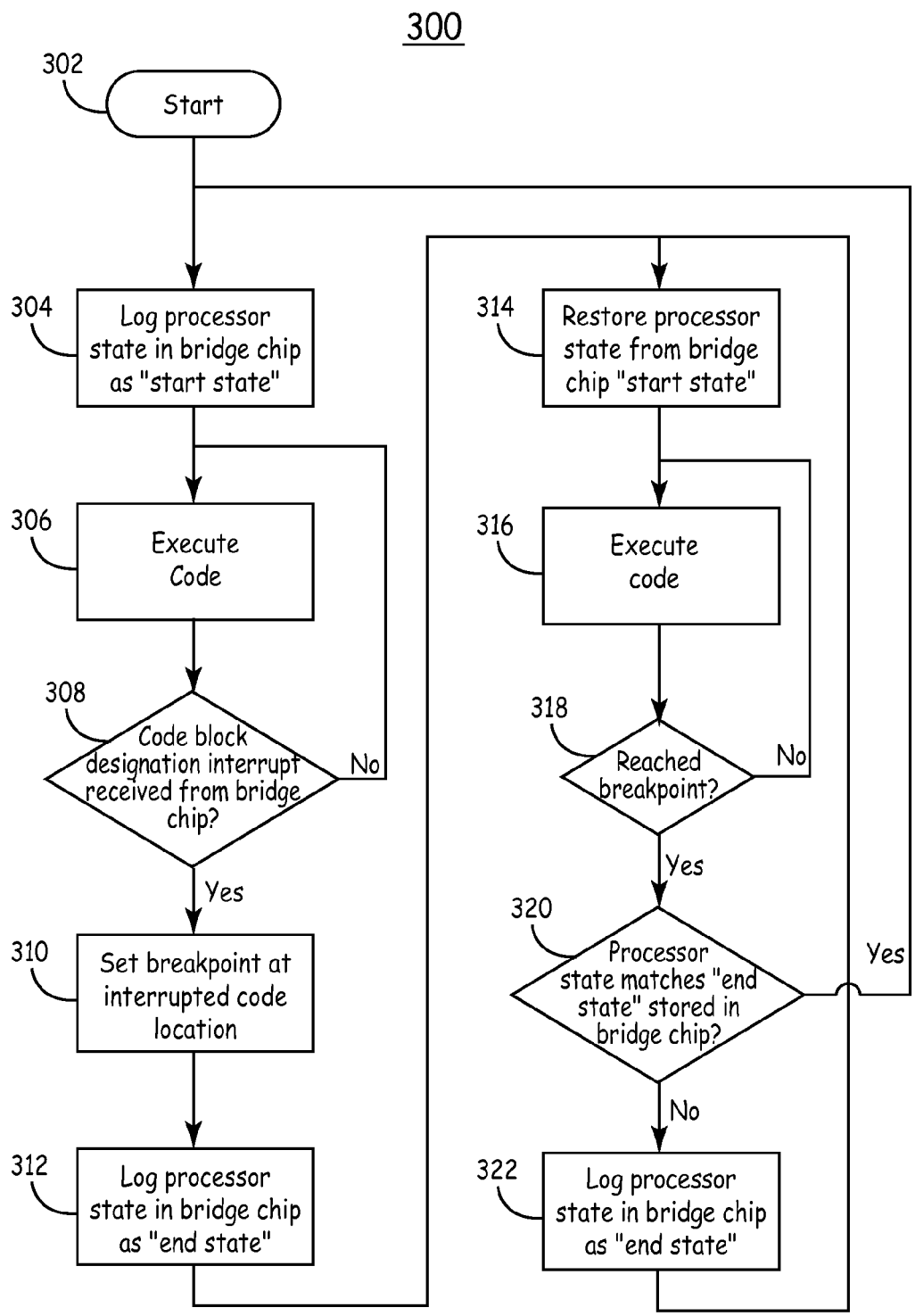
FIG. 3 is an embodiment of a method to enable an adaptive fault tolerance in a data system in accordance with the present application.

FIG. 3 is an embodiment of a method 300 to enable an adaptive fault tolerance in a data system in accordance with the present application. The method 300 is described with reference to the system 10 of FIG. 1.

The method 300 begins at block 302. The state of the processing element 110 (the processor state) is logged in the bridge chip 100 as a start state (block 304). Then the processing element 110 starts execution of code (block 306). The execution of the code proceeds until an interrupt signal 250 is received (block 308) at the interrupt service routine function 125 of the processing element 110. The interrupt signal is also referred to herein as a "code block designation interrupt" since a code block is delimited by two sequential interrupt signals. The bridge chip 100 sends an interrupt signal to the processing element 110 when a code block has been executed. The processing element 110 enters an interrupt service routine when the interrupt signal is received at the interrupt service routine application 125.

The processing element 110 sets a hardware breakpoint at the location where the code was interrupted (block 310) when the interrupt service routine is initiated. The processing element 110 sets the hardware breakpoint by logging a position of the program counter for the processing element 110 when the interrupt service routine is initiated. The "hardware breakpoint" is also referred to herein as "breakpoint." Also, the bridge chip 100 logs the processor state (i.e., the state of the processing element 110) as an end state (block 312) in the radiation hardened hardware element 100 when the interrupt service routine is initiated. The end state is received at the bridge chip 100 via status interface 150 and communication link 146 and is recorded in the memory 105.

Additionally, information about memory accesses to the main memory 120 that is communicatively coupled to the processing element 110 is received at the bridge chip 100 and recorded in memory. Thus, as defined herein, the state of the processing element includes information indicative of accesses to one or more memory or cache system by the processing element. The Ser. No. 12/625,209 Application, which is incorporated herein by reference, describes embodiments of cache systems (and cache architectures) and methods of implementing the cache systems to provide accurate information about the memory access. In one implementation of this embodiment, the interrupt signal sent to the processing element 110 is also sent to an embodiment of a cache system described in the related Ser. No. 12/625,209 Application.

The state of the processing element 110 is rolled back (restored) to the start state by the bridge chip 100 (block 314). When the state of the processing element 110 is set back to the start state at the start of the code block, the code is executed (block 316) for the second time. The processing element 110 monitors the data for the hardware breakpoint that was set during block 310 while the code block is being executed at block 316. At the end of the second run of the code block, the processing element 110 reaches the hardware breakpoint in the code (block 318). When the processing element 110 reaches the hardware breakpoint, the code block has been executed a second time.

Then, the system 10 determines if the processor state at the end of the second execution of the code block matches the end state of the processor element 110 at the end of the first run of the code block (block 322). In this manner, the system 10 determines if the state information matches after two sequential executions of the same code block by the processing element.

System 10 can make the comparison in several ways. In one implementation of this embodiment, the state of the processing element 110 after the second execution of the code block (referred to herein as "current end state") is stored in the memory 105 in the bridge chip 100 and the processor 107 in the bridge chip 100 compares the previously stored end state and the current end state. In another implementation of this embodiment, the interrupt service routine application 125 in the processing element 110 handles the comparison of the end state stored in the memory 105 of the bridge chip and the current end state of the processing element 110 after the second execution of the code block.

If the recorded state information after the first execution of the code block (the end state) does not match the state information after the second execution of the code block (the current end state), an error is detected by the system 10 and the flow proceeds to block 322. Additionally, if the recorded information about memory accesses to the main memory 120 after the first execution of the code block does not match the recorded information about memory accesses to the main memory 120 after the second execution of the code block, an error is detected by the system 10.

When an error is detected at block 320, the bridge chip 100 logs a state of the processing element as an end state (block 322) and the flow proceeds back to block 314, and the state of the processing element 110 is rolled back (restored) to the start state by the bridge chip 100. In this manner, if the execution of a code block does not match, then the bridge chip 100 rolls the processing element 110 back to the state in which it last successfully executed a code block and the processing element 110 starts to execute the code block again from that state. Thus, the rollback includes resetting the processing element 110 to the previous breakpoint, the previous state, and the program counter in the processing element 110 for the last valid code block. That information is stored in the memory 105 of the bridge chip 100.

If the recorded state information after the first execution of the code block does matches the state information after the second execution of the code block at block 320, no error is detected, and processing element 110 logs a new checkpoint (block 304) and proceeds to execute the next code block (block 306).

Thus, the bridge chip 100 keeps track of successfully executed code blocks in a running list. When there is a successful compare, the bridge chip 100 increments the validated states. The bridge chip 100 stores the running list of successfully validated states in memory 105. A new checkpoint indicates the amount of time that the processing element 110 was successfully executed.

In one implementation of this embodiment, the system includes a self checking pair on a COTS processor chip (in place of the single processing element 110) and a single radiation hardened bridge chip to improve the fault tolerance of the system 10 of FIG. 1. In this case, the two processing elements are run in lock step and are simultaneously triggered by the interrupt signal to send the state of the processing element and the memory accesses to the bridge chip.

In another implementation of this embodiment, the system includes two or more different processing elements and the radiation hardened bridge chip 100 sends the interrupt signals and logs the states for each of the processing elements in the manner described above.

Thus, the embodiments of the system described herein provide, an external radiation-hardened chip that issues an interrupt to the processing element(s) after a code block is executed. This interrupt causes the processing element(s) to enter a specific comparison/checkpointing/rollback interrupt service routine (ISR). The application developers for the processing elements described herein install an interrupt service routine for the processors being monitored. The interrupt service routines in the respective processing elements are triggerable by the bridge chip via an interrupt interface. The bridge chip has access to the registers in the processing elements via a status interface.

In embodiments with multiple processing elements, either on a monolithic die or multiple die, the processing elements may share a main memory via a bridge chip or other mechanism, or each may have its own main memory, as long as a method is in place for comparing memory content and rolling back memory state in the event of a state comparison mismatch.

Although specific embodiments have been illustrated and described herein, it will be appreciated by those skilled in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof

What is claimed is:

1. A method to enable an adaptive fault tolerance in a data system, the method comprising:
communicatively coupling a radiation hardened hardware element to at least one interrupt service routine application in a respective at least one processing element;
triggering an interrupt service routine by an interrupt signal received from the radiation hardened hardware element at the interrupt service routine application after an execution of a code block by the at least one processing element;
receiving state information at the radiation hardened hardware element responsive to the triggering of the interrupt service routine, the state information corresponding to an internal state of the at least one processing element; and
inspecting the state information to determine if an error occurred.

2. The method of claim 1, further comprising logging a state of the at least one processing element as a start state in the radiation hardened hardware element prior to the execution of the code block by the at least one processing element.

3. The method of claim 2, further comprising:
setting a breakpoint at the interrupted code location responsive to the triggering of the interrupt service routine after a first execution of the code block by the at least one processing element; and
logging a state of the at least one processing element as an end state in the radiation hardened hardware element after the first execution of the code block by the at least one processing element.

4. The method of claim 3, further comprising:
rolling back the at least one processing element to the start state if the inspecting results in determination that an error occurred; and
re-executing the code block responsive to the rolling back.

5. The method of claim 4, wherein rolling back the at least one processing element to the start state includes:
logging a state of the at least one processing element as an end state in the radiation hardened hardware element after a second execution of the code block by the at least one processing element; and
restoring the state of the at least one processing element to the start state prior to re-executing the code block.

6. The method of claim 1, wherein inspecting the state information comprises:
determining if the state information matches after two sequential executions of the code block by the at least one processing element.

7. A hardware assisted checkpointing and recovery system to flexibly provide fault tolerance comprising:
a radiation hardened bridge chip to issue an interrupt signal to at least one processing element;
the at least one processing element communicatively coupled to receive the interrupt signal from the bridge chip via an interrupt interface, wherein the at least one processing element enters an interrupt service routine responsive to receiving the interrupt signal; and
at least one status interface to transfer information indicative of the state of the respective at least one processing element to the bridge chip during the interrupt service routine, wherein the system determines if the at least one processing element experienced an error while executing a code block, and wherein, if an error is detected, the system initiates a rollback to a last known-good state on the at least one processing element.

8. The hardware assisted checkpointing and recovery system of claim 7, wherein the at least one status interface comprises at least one JTAG interface communicatively coupling the respective at least one processing element to the bridge chip to provide visibility into processor registers of the respective at least one processing element at the bridge chip.

9. The hardware assisted checkpointing and recovery system of claim 8, wherein the processor registers of the at least one processing element include status registers, program counter, integer, and floating point registers.

10. The hardware assisted checkpointing and recovery system of claim 7, wherein the at least one processing element is at least one commercial off-the-shelf processing element.

11. The hardware assisted checkpointing and recovery system of claim 7, further comprising:
at least one main memory communicatively coupled to a respective at least one processing element, wherein the bridge chip determines if the at least one processing element experienced an error by comparing recorded state information for the at least one processing element at the end of at least two executions of the code block and by comparing information about access of the at least one processing element to the respective at least one main memory at the end of the at least two executions of the code block.

12. The hardware assisted checkpointing and recovery system of claim 7, wherein the at least one processing element is a single processing element, wherein each code block is executed at least twice and at the end of each execution of the code block, the processing element enters an interrupt service,
wherein, when the execution is a first execution of the code block, a hardware breakpoint is set at the end of the code block routine and state information of the processing element is recorded in the bridge chip, and
wherein, when the execution is a second execution of the code block, the state information recorded after the first execution is compared with the state information after the second execution of the code block.

13. The hardware assisted checkpointing and recovery system of claim 7, wherein the bridge chip is one of a programmable processor, a field programmable gate array (FPGA), special purpose processing function, or an application-specific integrated circuit (ASIC).

14. The method of claim 13, further comprising:
receiving information about memory accesses to main memory communicatively coupled to the processing element at the bridge chip responsive to the interrupt signal; and
determining if the information about memory accesses to main memory matches at the bridge chip.

15. A method to enable an adaptive fault tolerance in a data system, the method comprising:
executing a code block by a processing element;
sending an interrupt signal from a radiation hardened bridge chip to initiate an interrupt service routine at the processing element after the code block is executed; and
inspecting the internal state of the processing element to determine if an error occurred by:
receiving state information for the processing element at the bridge chip responsive to the interrupt signal, and
determining if the state information matches after two executions of the code block.

16. The method of claim 15, further comprising:
recording the state of the processing element at the bridge chip after a first execution of the code block;
rolling back the state of the processing element to the state at the beginning of the first execution of the code block; and
re-executing the code block by the processing element.

17. The method of claim 16, further comprising:
recording the state of the processing element at the bridge chip after a second execution of the code block in the bridge chip, wherein determining if the state information matches after two executions of the code block includes comparing the state information recorded in the bridge chip after the second execution of the code block with the state information recorded in the bridge chip after the first execution of the code block at the bridge chip.

18. The method of claim 16, wherein when state information after the second execution of the code block disagrees with state information recorded after the first execution of the code block, the method further comprises:
logging the processor state in the bridge chip after the second execution of the code block;
rolling back the state of the processing element to the state at the beginning of the first execution of the code block; and
re-executing the code block by the processing element a third time, wherein determining if the state information matches after two executions of the code block includes comparing the state information recorded in the bridge chip after the third execution of the code block with the state information recorded in the bridge chip after the second execution of the code block at the bridge chip.

19. The method of claim 15, further comprising:
receiving and recording information about memory accesses to a main memory communicatively coupled to the processing element at the bridge chip after a first execution of the code block; and
receiving and recording information about memory accesses to the main memory at the bridge chip after a second execution of the code block;
determining if the memory access information received after the second execution of the code block matches the memory access information recorded in the bridge chip after the first execution of the code block.

20. The method of claim 19, wherein when memory access information received after the second execution of the code block disagrees with the memory access information recorded in the bridge chip after the first execution of the code block, the method further comprises:
logging the processor state in the bridge chip after the second execution of the code block;
rolling back the state of the processing element to the state at the beginning of the first execution of the code block; and
re-executing the code block by the processing element a third time.

* * * * *